(12) United States Patent
Srivastava et al.

(10) Patent No.: US 7,440,852 B2
(45) Date of Patent: Oct. 21, 2008

(54) STOCHASTIC ANALYTICAL SOLUTION TO QUANTIFY THE EARTH'S SUBSURFACE HEAT FLOW

(75) Inventors: Kirti Srivastava, Andhra Pradesh (IN); Rishi Narain Singh, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/813,436

(22) Filed: Mar. 31, 2004

(65) Prior Publication Data

US 2004/0243311 A1    Dec. 2, 2004

Related U.S. Application Data

(60) Provisional application No. 60/458,405, filed on Mar. 31, 2003.

(51) Int. Cl.
G06F 19/00 (2006.01)
G01V 3/00 (2006.01)
G01V 7/00 (2006.01)

(52) U.S. Cl. .................. 702/2; 73/204.11; 73/784; 374/43; 374/45; 165/276

(58) Field of Classification Search ............. 702/2, 702/6, 12, 9, 33, 127, 130; 73/204, 755; 261/127, 137; 374/43, 45, 55; 165/276
See application file for complete search history.

(56) References Cited

U.S. PATENT DOCUMENTS 3,864,208 A * 2/1975 Van Huisen ............ 376/276
3,889,473 A * 6/1975 Van Huisen ............ 405/61
4,381,462 A * 4/1983 Radebold ............... 310/11
4,817,672 A * 4/1989 Broodman .............. 138/113
4,861,167 A * 8/1989 Lobo et al. ............. 374/44
5,320,071 A * 6/1994 Valenti et al. .......... 122/250 R
7,130,758 B2 * 10/2006 Srivastava et al. ...... 702/136

OTHER PUBLICATIONS

Unal et al., 'Stochastic Differential Equations and Geometric Flows', Dec. 2002, IEEE Publication, vol. 11, No. 12, pp. 1405-1416.*
Gallagher et al, "The Role Thermal Conductivities Measurements in Modeling the Thermal Histories in Sedimentary Basins", Mar Petrol Geol., 14, 201-214, 1997.
Jokinen et al., "Random Modelling of the Lithospheric Thermal Regime: Forward Simulations Applied in Uncertainty Analysis", Tectonophysics, 306, 277-292, 1999.

(Continued)

*Primary Examiner*—Edward Raymond
*Assistant Examiner*—Elias Desta
(74) *Attorney, Agent, or Firm*—Nixon & Vanderhye P.C.

(57) ABSTRACT

An analytical closed form solution to mean and variance in heat flow is obtained by solving the stochastic heat conduction equation incorporating randomness in the thermal conductivity. The method has a wide range of applications in quantifying the thermal state of the crust and in obtaining closed form expressions for subsurface heat flow structure along with its error bounds. The exact formulae employed can be used to better evaluate the thermal state for related oil and natural gas applications and also in tectonic studies and in studies related to the crystallization of minerals.

10 Claims, 3 Drawing Sheets

OTHER PUBLICATIONS

Jonkinen et al., "Inverse Simulation of the Lithospheric Thermal Regime Using the Monte Carlo Method", , Tectonophysics, 306, 293-310, 1999.

Nielson, Steady State Heat Flow in a Random Medium and Linear Heat Flow Heat Production Relationship, Geophysical Research Letters< vol. 14, p. 318-321, 1987.

Roy et al., "Geothermal Investigations in the 1993 Latur Earthquake Area, Deccan Volcanic Province, India", Tectonophysics, 306, pp. 237-252, 1999.

Royer et al., "Steady State Geothermal Model of the Crust and the Problem of the Boundary Conditions:Application to a Rift System, the Southern Rhinegraben", Tectonophysics, 156 (1988) 239-255.

Serrano, "Forecasting Scale-Dependent Dispersion from Spills in Heterogeneous Aquifers", Journal of Hydrology, 169 (1995), 151-169.

Srivastava et al., "A Model for Temperature Variations in Sedimentary Basins due to Random Radiogenic Heat Sources", Geophys, J. Int. (1998), 135, 727-730.

Srivastava et al., "A Stochastic Model to Quantify the Steady-State Crustal Geotherms Subject to Uncertainties in Thermal Conductivity", Geophys. J. Int. (1999), 138, 895-899.

Vasseur et al., "Effects of Random Horizontal Variations in Radiogenic Heat Source Distribution on Its Relationship with Heat Flow", Journal of Geophysical Research, vol. 91, No. 810, pp. 10,397-10,404, Sep. 10, 1986.

Vasseur et al., "The Problem of Heat Flow Density Determination From Inaccurate Data", Tectonophysics, 121 (1985) 25-34.

* cited by examiner

STOCHASTIC ANALYTICAL SOLUTION TO QUANTIFY THE EARTH'S SUBSURFACE HEAT FLOW

This application hereby claims and is entitled to the benefit of provisional application Ser. No. 60/458,405, filed Mar. 31, 2003.

FIELD OF THE INVENTION

The present invention relates to obtaining the analytical closed form solution to mean and variance in heat flow by solving the stochastic heat conduction equation incorporating randomness in the thermal conductivity. The method of the present invention has a wide range of applications in quantifying the thermal state of the crust and in obtaining closed form expressions for subsurface heat flow structure along with its error bounds. The exact formulae used in the invention can be used to better evaluate the thermal state for related oil and natural gas applications and also in tectonic studies and in studies related to the crystallization of minerals.

BACKGROUND OF THE INVENTION

Heat flow studies play an important role in understanding the state of the lithosphere. For modeling the conductive heat transfer in the crust the important controlling parameters are the radiogenic heat production and the thermal conductivity. In case of a stabilized continental crust the conductive heat transfer in steady state condition is a reasonably good approximation. Several authors have studied the evolution of the basal heat flow from a deterministic point of view. However due to the heterogeneous nature of the crust researchers are now solving the heat conduction problem from a stochastic point of view.

Quantification of perturbations in the temperatures and heat flow using stochastic analytical and random simulation techniques have been carried out by several authors. The uncertainty in the heat flow using a least squares inversion technique incorporating uncertainties in the temperature and thermal conductivities has been done, Tectonophysics, Vol 121, 1985 by Vausser et al. The effect of variation in heat source on the surface heat flow has also been studied, Journal Geophysical Research, V 91, 1986, by Vasseur and Singh, Geophysical Research Letters, V14, 1987, by Nielsen.

The small perturbation method to solve the stochastic heat conduction equation has been used to solve the 1-D steady state equation with uncertainties in the heat sources to obtain the mean temperature field along with its error bounds , Geophysical Journal International, 135, 1998, by Srivastava and Singh. Several researchers have been using the numerical method, the random simulation method, to model the error structure in the thermal field incorporating uncertainties in the controlling thermal parameters, Tectonophysics, V156, 1988 by Royer and Danis, Marine and Petroleum Geology, V 14, 1997, by Gallagher et al, Tectonophysics, V 306, 1999a,b, by Jolinen and Kukkonen.

The diffusion problems in stochastic framework are now being solved by yet another approach called the decomposition method, Journal of Hydrology, V 169, 1995, by Serrano. In this invention the same approach as given in Geophysical Journal International, V 138, 1999, by Srivastava and Singh, has been used to solve the stochastic heat conduction equation incorporating Gaussian uncertainties in the thermal conductivity to obtain the solution to the mean and variance in the subsurface heat flow field.

BRIEF SUMMARY OF THE INVENTION

One main object of the invention is to provide a method for the stochastic analysis to quantify the earth's subsurface area heat flow and its error bounds and which reduces drawbacks of the prior art enumerated above.

It is another object of the invention to provide a method for obtaining a solution to the stochastic heat conduction equation in an efficient manner which also enables the quantification of earth's subsurface area heat flow and its error bounds in an efficient manner.

It is a further object of the invention to provide a method for the quantification of the thermal state of the earth's crust wherein the variation in the thermal conductivity is quantified using a random correlation structure.

SUMMARY OF THE INVENTION

The present invention accordingly provides a method for the quantification of the earth's subsurface area heat flow and its error bounds by stochastic analysis comprising devising a stochastic heat conduction equation based on random thermal conductivity, an exponentially decreasing heat source and associated boundary conditions and arriving at a stochastic solution to the temperature field obtained using a series expansion method, and obtaining the expression for mean heat flow and variance in heat flow.

In one embodiment of the invention, the boundary conditions are surface temperature and surface heat flow.

In another embodiment of the invention, the stochastic heat conduction equation is of the formula $$\frac{d}{dz}\left(K(z)\frac{dT}{dz}\right) = -A(z)$$

In another embodiment of the invention, the stochastic heat conduction equation is solved using a series expansion method to obtain the closed form solution to the mean and variance in the heat flow fields, and using thermal conductivity of the subsurface layer of the earth's crust as a random parameter.

In yet another embodiment of the invention, the expression for heat flow is obtained and the expressions for the mean and variance in heat flow derived by taking expectation and using the property of the random field.

BRIEF DESCRIPTION OF THE ACCOMPANYING DRAWINGS

DETAILED DESCRIPTION OF THE EXEMPLARY EMBODIMENTS OF THE INVENTION

The present embodiment relates to solving the governing stochastic heat conduction equation to obtain the mean and variance in the heat flow fields. The governing heat conduction equation in steady state is expressed as $$\frac{d}{dz}\left(K(z)\frac{dT}{dz}\right) = -A(z) \quad (1)$$

Figure 1:
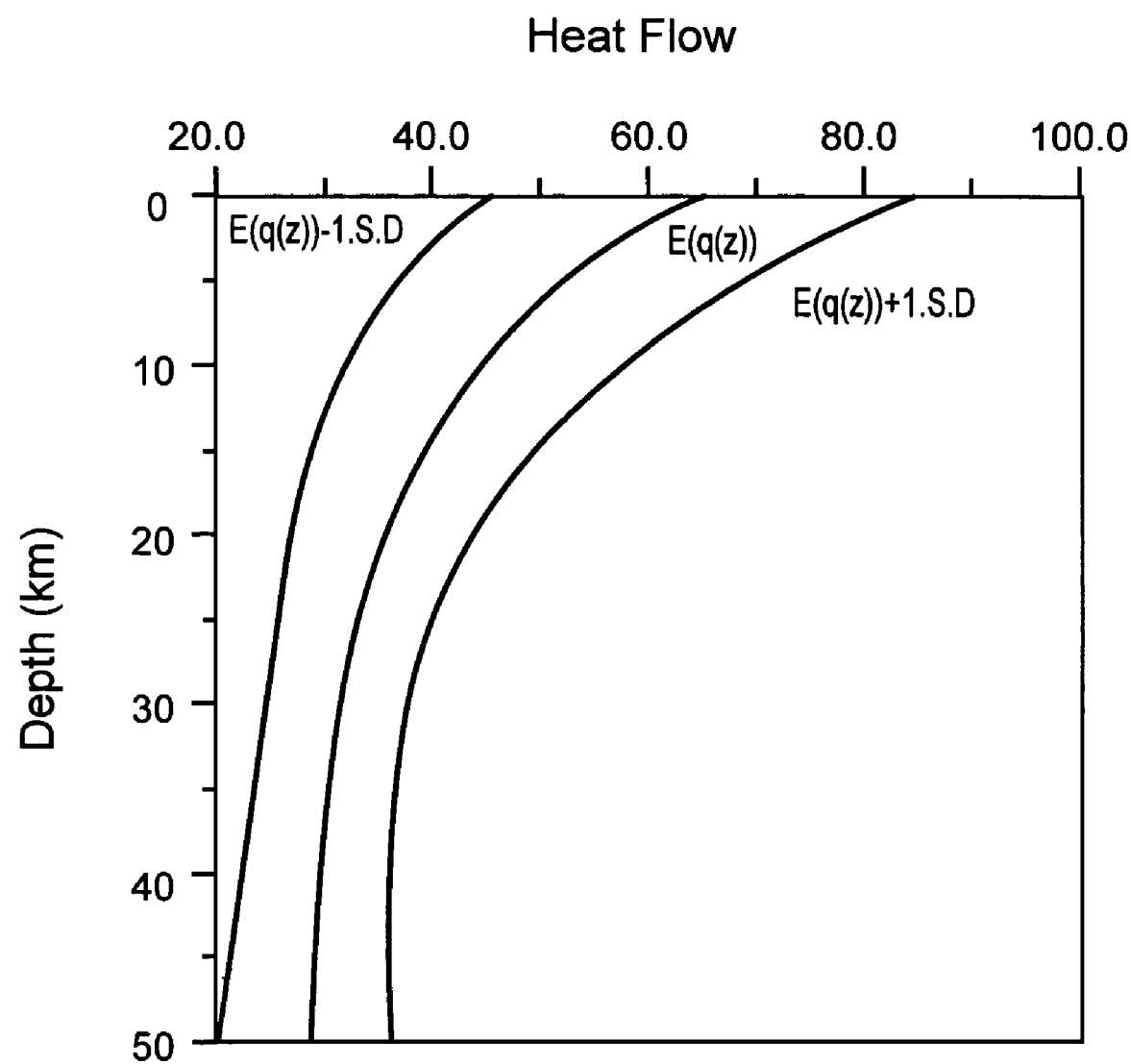
FIG. 1 shows the plot of mean heat flow ±1 standard deviation versus depth for a synthetic model.

The present embodiment relates to solving the governing stochastic heat conduction equation to obtain the mean and variance in the heat flow fields as shown in FIG. 1.

This heat conduction equation is mostly solved under the assumption of a constant thermal conductivity or temperature dependent thermal conductivity. Both these assumptions require one to assume realistic values of the thermal properties in the crust and the upper values of these parameters. One way to overcome this problem is to consider the thermal parameters to be a realization of a random process.

In the present embodiment the radiogenic heat production is assumed to be exponentially decreasing function and the thermal conductivity is considered to be a random parameter which is expressed as a sum of a deterministic component and a random component. The stochastic heat conduction equation then reduces to $$\frac{d}{dz}\left((\overline{K} + K'(z))\frac{dT}{dz}\right) = -A_0 e^{-z/D} \quad (2)$$

where T is the temperature (° C.)
$A_0$ is the radiogenic heat production at the surface ($\mu W/m^3$)
D is the characteristic depth (m),
$K(z) = \overline{K} + K'(z)$ is the thermal conductivity (W/m° C.) which is expressed as a sum of a deterministic component and a random component ($\overline{K}$ is the mean or the deterministic value and $K'(z)$ is the random component).

Boundary conditions employed in this invention are Constant surface temperature $$T(0) = T_0 \quad (3)$$

and a constant mean surface heat flow $$\overline{K}\frac{dT}{dz} = Q_s \quad (4)$$

The random component of the thermal conductivity is assumed to have a Gaussian colored noise correlation structure represented by $$E(K'(z)) = 0 \quad (5)$$

$$E(K'(z_1)K'(z_2)) = \sigma_K^2 e^{-\rho|z_1 - z_2|} \quad (6)$$

where $\sigma_K^2$ is the variance is thermal conductivity, $\rho$ is the correlation decay parameter (or $1/\rho$ is the correlation length scale) and $z_1$ and $z_2$ are the depths.

Following the procedure given in Geophysical J International, V 138, 1999, by Srivastava and Singh, the solution to the temperature field is obtained using the series expansion method as $$T(z) = T_0 + \frac{Q_s}{\overline{K}}z + \frac{A_0 D^2}{\overline{K}}\left(1 - \frac{z}{D} - e^{-z/D}\right) + \quad (7)$$

$$\frac{A_0}{\overline{K}^2}\int_0^z (z-\xi)[K'(\xi)e^{-\xi/D} - DK'_\xi(\xi)e^{-\xi/D}]d\xi -$$

-continued $$\frac{(Q_s - A_0 D)}{\overline{K}^2}\int_0^z (z-\xi)K'_\xi(\xi)d\xi$$

In this embodiment the closed form analytic expressions for mean heat flow and error bounds on heat flow have been obtained. The expression for heat flow with random thermal conductivity is expressed as $$q(z) = \overline{K}\frac{dT}{dz} + K'(z)\frac{dT}{dz} \quad (8)$$

Using the solution of T(z) (equation 15) and differentiating it by using Leibnitz rule for differentiation under integrals and then taking expectation on both sides of equation (8) and applying the property of random fields (equation 5 & 6) the expression for the mean heat flow has been obtained as $$\overline{q}(z) = (1 - C_K^2)(Q_s - A_0 D(1 - e^{-z/D})) + C_K^2 Q_s e^{-\rho z} \quad (9)$$

where $C_K = \sigma_K/\overline{K}$ is the coefficient of variability of thermal conductivity. If $C_K = 0$ in the above equation then the solution reduces to the deterministic solution.

From the above equation it is clear that the mean heat flow is controlled by the coefficient of variability of thermal conductivity and to a small extent on the correlation length scale.

The random component of the heat flow can be expressed as $$q'(z) = q(z) - \overline{q}(z) \quad (10)$$

$$= \frac{A_0}{\overline{K}^2}\int_0^z K'(\xi)e^{-\xi/D}d\xi - \frac{A_0 D}{\overline{K}^2}\int_0^z K'_\xi(\xi)e^{-\xi/D}d\xi -$$

$$\frac{(Q_s - A_0 D)}{\overline{K}^2}\int_0^z K'_\xi(\xi)d\xi + \frac{K'(z)(Q_s - A_0 D + A_0 D e^{-z/D})}{\overline{K}}$$

The covariance at $z_1$ and $z_2$ is obtained by taking expectation of $E\{q'(z_1)q'(z_2)\}$ and setting $z_1 = z_2 = z$ the closed form solution to the variance in heat flow has been obtained as $$\sigma_q^2 = q1 \times T1 + q2 \times T2 + q3 \times T3 + q4 \times T4 + q5 \times T5 - q6 \times T6 + q7 \times T7 - q8 \times T8 + q9 \times T9 \quad (11)$$

where
$q1 = C_K^2 A_0^2 (1 - \rho D)^2$
$q2 = q3 = C_K^2 (Q_1 - A_0 D) A_0 \rho(\rho D - 1);$
$q4 = C_K^2 (Q_1 - A_0 D)^2 \rho^2$
$q5 = q7 = C_K^2 (Q_1 - A_0 D + A_0 D e^{-z/D}) A_0 (1 - \rho D)$
$q6 = q8 = C_K^2 (Q_3 - A_0 D + A_0 D e^{-z/D})(Q_3 - A_0 D)\rho$
$q9 = C_K^2 (Q_1 - A_0 D + A_0 D e^{-z/D})^2$ The closed form solution to the integrals are $$T1 = \frac{1}{(\rho - 1/D)}\left(\frac{(1 - e^{-2z/D})}{2/D} + \frac{(e^{-z(\rho + 1/D)} - 1)}{(\rho + 1/D)}\right) +$$

$$\frac{1}{(\rho + 1/D)}\left(\frac{(1 - e^{-2z/D})}{2/D} + \frac{(e^{-z(\rho + 1/D)} - e^{-2z/D})}{(\rho - 1/D)}\right)$$

$$T2 = \frac{1}{\rho}\left(\frac{(1 - e^{-z/D})}{1/D} + \frac{(e^{-z(\rho + 1/D)} - 1)}{(\rho + 1/D)}\right) +$$

-continued $$\frac{1}{\rho}\left(\frac{(1-e^{-z/D})}{1/D}+\frac{(e^{-z\rho}-e^{-z/D})}{(\rho-1/D)}\right)$$

$$T3 = \frac{1}{(\rho-1/D)}\left(\frac{(1-e^{-z/D})}{1/D}+\frac{(e^{-sz\rho}-1)}{\rho}\right)+$$

$$\frac{1}{(\rho+1/D)}\left(\frac{(1-e^{-z/D})}{1/D}+\frac{(e^{-z(\rho+1/D)}-e^{-sz/D})}{\rho}\right)$$

$$T4 = \frac{2}{\rho}\left(z+\frac{(e^{-z\rho}-1)}{\rho}\right)$$

$$T5 = \frac{(e^{-z/D}-e^{-\rho z})}{(\rho-1/D)}$$

$$T6 = \frac{(1-e^{-\rho z})}{\rho} \quad T7 = T5 \quad T8 = T6 \quad T9 = 1$$

A novelty in the present invention over the prior art methods resides in that the method uses randomness in thermal conductivity structure to quantify errors in heat flow and leads to closed form solutions to the mean and its error bounds on the subsurface heat flow.

The present embodiment describes a method of solving the stochastic heat conduction equation to obtain the closed form solution to the mean and variance in the heat flow fields. Using the thermal conductivity to be a random parameter the stochastic heat conduction equation has been solved and first the solution to the temperature field is built using a series expansion method. Next the expression for heat flow is obtained and subsequently the expressions for the mean and variance in heat flow have been derived.

The aim of this embodiment is to provide exact formula for quantifying the error bounds on the subsurface heat flow.

EXAMPLES

The subsurface heat flow along with its error bounds up to Moho depth has been computed using the expressions obtained for mean heat flow and its standard deviation for two examples (1) Synthetic Earth Model and (2) Latur region of India, which shows the efficacy of the present invention. Most of the present investigations compute the subsurface heat flow in a deterministic way where the solution are obtained on the assumption that the input controlling thermal parameters are assumed to be known with certainty. As the Earth system is highly heterogeneous some amount of uncertainty is bound to exist in the input controlling parameters. Hence one needs to quantify the errors in the dynamical behavior of the system. In this invention the error bounds on the subsurface heat flows have been quantified for different values of the controlling thermal parameters.

Example 1

Controlling Input Thermal Parameters for a Synthetic Earth Model

Numerical values of the controlling input parameters for a realistic Earth model are,

| | | |
|---|---|---|
| Radiogenic heat production (A) | 3.0 | ($\mu W/m^3$) |
| Characteristic Depth (D) | 12 | (km) |
| Moho Depth (L) | 50 | (km) |
| Surface Temperature ($T_0$) | 0 | (° C.) |
| Surface heat flow ($Q_s$) | 65 | ($mW/m^2$) |
| Random thermal conductivity: | | |
| Mean thermal conductivity $\overline{K}$ | 3.5 | ($mW/m^2$) |
| Coefficient of variability $C_k$ | 0.3 | |
| Correlation length scale $l/\rho$ | 25 | km |

Example 2

Controlling Input Thermal Parameters for the Latur Region, India.

Numerical values of the controlling input parameters, Tectonophysics, V 306, 1999, Roy and Rao.

| | | |
|---|---|---|
| Radiogenic heat production (A) | 2.6 | ($\mu W/m^3$) |
| Characteristic Depth (D) | 12 | (km) |
| Moho Depth (L) | 37 | (km) |
| Surface Temperature ($T_0$) | 30 | (° C.) |
| Surface heat flow ($Q_s$) | 43 | ($mW/m^2$) |
| Random thermal conductivity: | | |
| Mean thermal conductivity $\overline{K}$ | 3.0 | ($mW/m^2$) |
| Coefficient of variability $C_k$ | 0.2 | |
| Correlation length scale $l/\rho$ | 17 | km |

The parameters associated with the random component are the coefficient of variability in the thermal conductivity and the correlation length scale. The coefficient of variability in the thermal conductivity can range from 0 to 1.0 and the correlation length scale should be less than L i.e the total length of the model. For this numerical study we have considered 20% error in the thermal conductivity and about half the length of the model as the correlation length scale. If we wish to increase the errors in the input thermal conductivity and see its behavior on the system output we could increase the coefficient of variability in the thermal conductivity.

Figure 2:
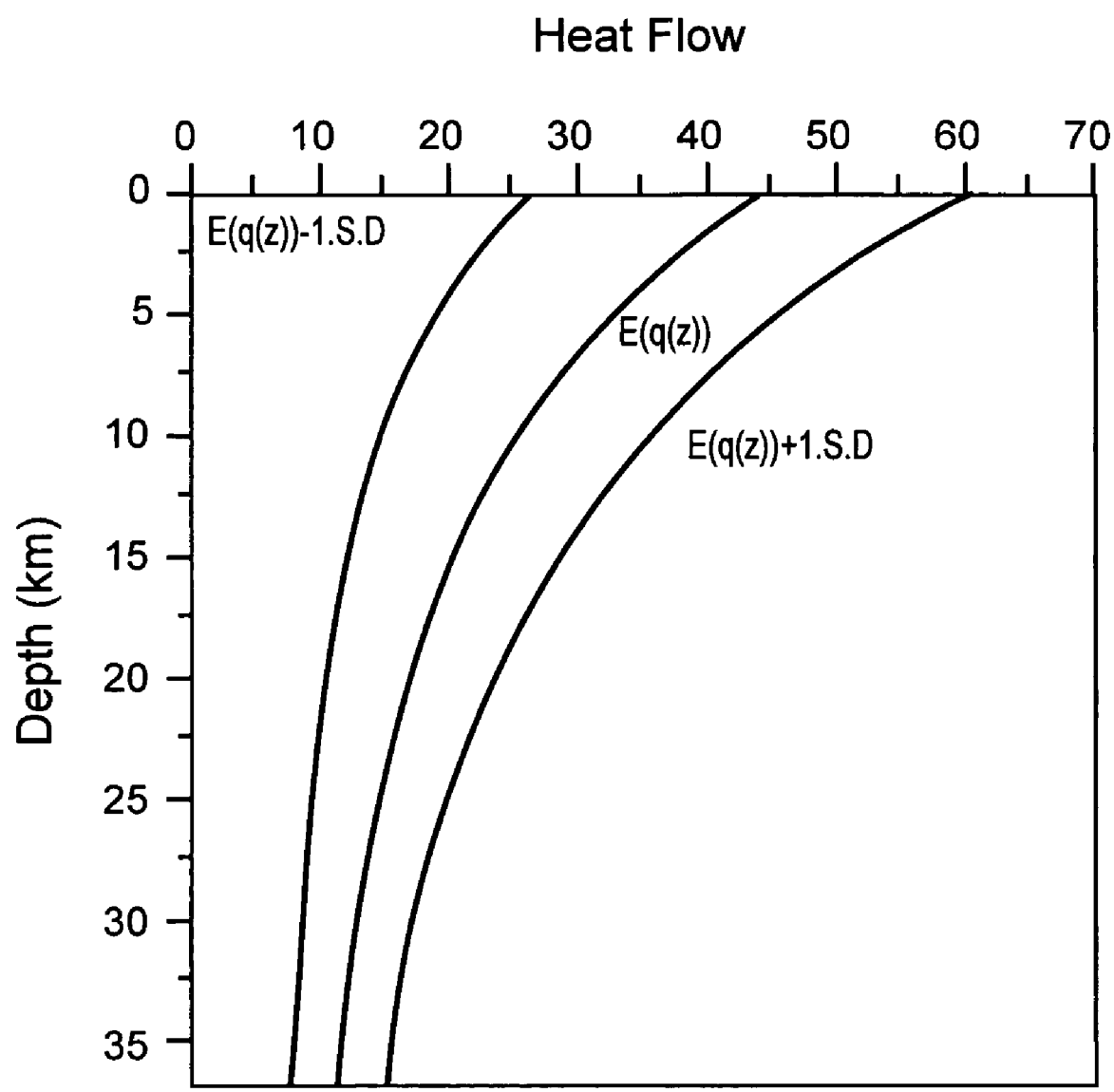
FIG. 2 shows the plot of mean heat flow ±1 standard deviation versus depth for Latur region, India.
Figure 3:
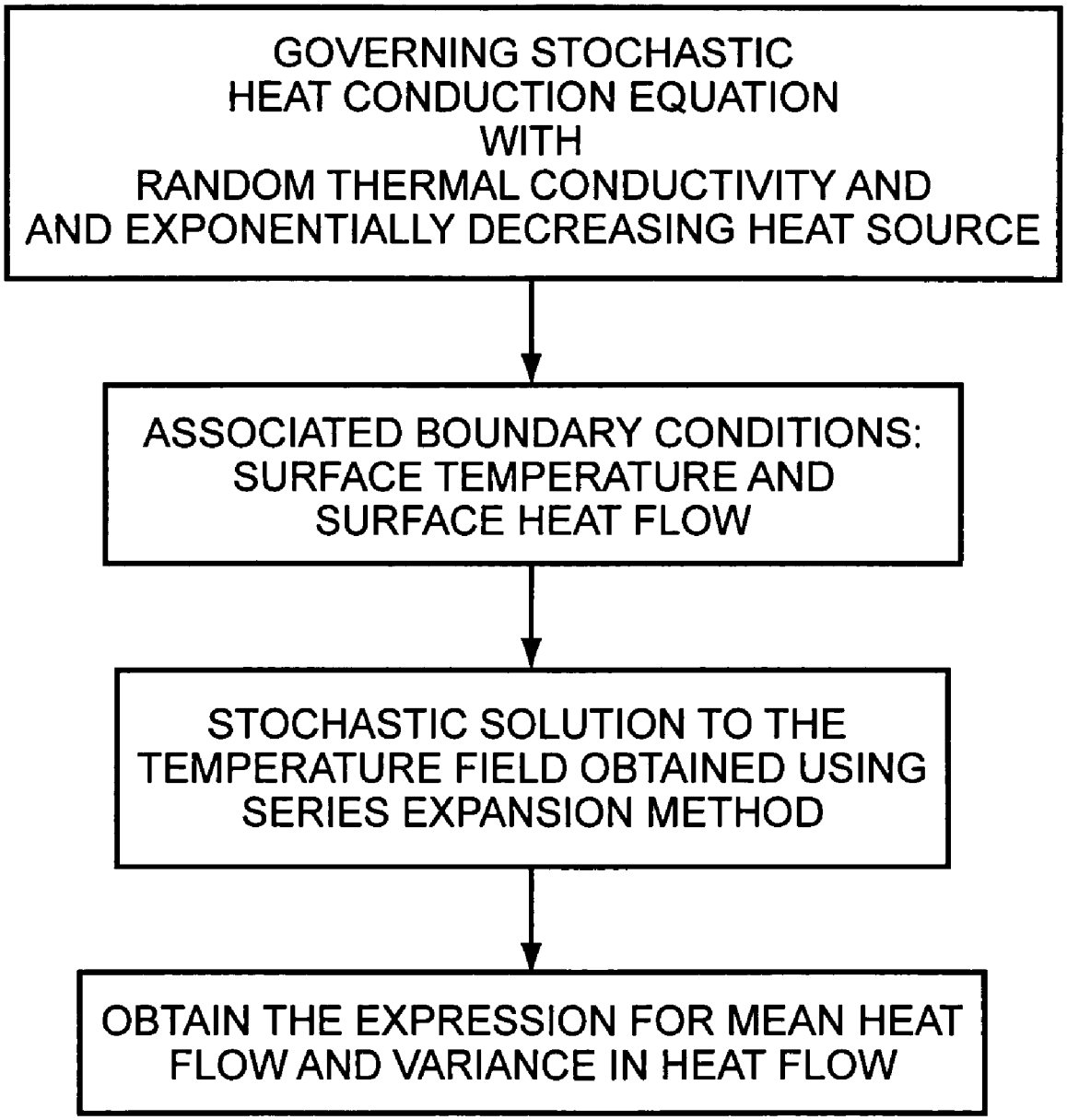
FIG. 3 is a flow sheet describing the process of the invention.

Using these controlling parameters the mean heat flow has been computed using equation (17) and the standard deviation is obtained from the expression for the variance (equation (19)). FIG. 1 shows the plot for mean heat flow along with its error bounds for example 1 and FIG. 2 is the plot for mean heat flow along with its error bounds for the Latur earthquake region. From both the figures we see that the error bounds on heat flow is maximum at the surface and decreases with depth These error bounds are very important and these exact formula have not been given so far.

In the present invention the expressions for mean heat flow and error bounds on heat flow have been obtained. The heat conduction equation is solved using a stochastic approach incorporating Gaussian randomness in the thermal conductivity and the solution is built using a series expansion method and closed form analytical solutions of mean and variance for heat flow fields have been estimated. These expressions are seen to be highly dependent of the controlling thermal parameters such as coefficient of variability in thermal conductivity, on the correlation length scale, on the depth and on the other controlling input parameters. Using these expressions one can estimate the mean heat flow at any given depth along with its error bounds. In most investigations the heat flow is estimated in a deterministic way or the error are quantified using the Monte Carlo simulation method. The advantage of this approach is that closed form expressions for mean and variance in the heat flow have been obtained and can be directly used for estimating the errors in the heat flow field due to error in the thermal conductivity.

It must be understood that the above description is intended to be illustrative of the invention. Modifications are possible without departing from the spirit of the invention.

Advantages:
1. The advantage of this invention is that exact formulaes have been given to quantify the error bounds on the subsurface heat flow.
2. The exact formula obtained for the mean and standard deviation in heat flow have not been so far given and will benefit the Geoscientific community dealing with Geodynamical . problems. This study can be used in quantifying the heat flow at any given depth along with its error structure for a conductive Earth model.

REFERENCES

Gallagher, K., Ramsdale, M., Lonergan. L., and Marrow, D., 1997, The role thermal conductivities measurements in modeling the thermal histories in sedimentary basins, Mar. Petrol. Geol., 14, 201-214.

Jokinen. J. and Kukkonen. I. T, 1999a, Radom modeling of lithospheric thermal regime: Forward simulation applied in uncertainty analysis, Tectonophysics, 306, 277-292.

Jokinen. J. and Kukkonen. I. T., 1999b, Inverse simulation of lithospheric thermal regime using the Monte Carlo method, 306, 293-310.

Nielson, S. B., 1987, Steady state heat flow in a random medium and linear heat flow heat production relationship, Geophys Res. Lett. 14, 318-321.

Roy. S. and Rao. R. U. M., 1999, Geothermal investigations in the 19993 Latur earthquake area, Deccan Volcanic Province, India, Tectonophysics, 306, 237-252.

Royer J. J. and Danis, M., 1988, Steady state geothermal model of the crust and problems of boundary conditions. Application to a rift system, the southern Rhinegraben, Tectonophysics, 156, 239-255.

Serrano, S. E., 1995, Forecasting scale dependent dispersion from spills in heterogeneous aquifers, J. Hydrology, 169, 151 - 169.

Srivastava, K., and Singh, R. N., 1998, A model for temperature variation in sedimentary basins due to random radiogenic heat sources, Geophys. J. Int., 135, 727-730.

Srivastava, K. and Singh, R. N., 1999, A stochastic model to quantify the steady state crustal geotherms subject to uncertainty in thermal conductivity, Geophy. J. Int, 138, 895-899.

Vasseur, G., and Singh, R. N., 1986, Effect of random horizontal variation in radiogenic heat source distribution on its relationship with heat flow, J. Geophys. Res. 91, 10397-10404.

Vasseur G., Lucazeau. F. and Bayer, R., 1985, The problem of heat flow density determination from inaccurate data, Tectonophysics, 121, 23-34.

What is claimed is:

1. A process for creating an analytical closed form model of the earth's subsurface area heat flow and its error bounds by stochastic analysis so that the model can be used to evaluate the thermal state of the earth for related oil and natural gas analyses and/or tectonic studies or studies related to crystallization of minerals, said process comprising:

inputting values to a computer representing random thermal conductivity, an exponentially decreasing heat source and associated boundary conditions;

using in said computer a stochastic heat conduction equation based on said input random thermal conductivity, exponentially decreasing heat source and associated boundary conditions to devise a stochastic solution to the temperature field obtained using a series expansion method, and obtaining from said computer an output representing an expression for mean heat flow and variance in heat flow.

2. A process as in claim 1 wherein the boundary conditions are surface temperature and surface heat flow.

3. A process as in claim 1 wherein the stochastic heat conduction equation is of the formula $$\frac{d}{dz}\left(K(z)\frac{dT}{dz}\right) = -A(z).$$

4. A process as in claim 1 wherein the stochastic heat conduction equation is solved using a series expansion method to obtain the closed form solution to the mean and variance in the heat flow fields, and using thermal conductivity of the subsurface layer of the earth's crust as a random parameter.

5. A process as in claim 1 wherein the expression for heat flow is obtained and the expressions for the mean and variance in heat flow derived by taking expectation and using the property of the random field.

6. A process for evaluating of the thermal state of the earth for use in related oil and natural gas application in tectonic studies and/or in studies related to the crystallization of minerals, said process comprising:

quantifying the earth's subsurface area heat flow and its error bounds by stochastic analysis by inputting values representing random thermal conductivity, an exponentially decreasing heat source and associated boundary conditions;

using a stochastic heat conduction equation based on said input random thermal conductivity, exponentially decreasing heat source and associated boundary conditions to devise a stochastic solution to the temperature field obtained using a series expansion method, and obtaining and outputting as a tangible result an expression for mean heat flow and variance in heat flow for use in said oil and natural gas analysis, tectonic studies and/or studies related to the crystallization of minerals.

7. A process as in claim 6 wherein the boundary conditions are surface temperature.

8. A process as in claim 6 wherein the stochastic heat condition equation is of the formula $$\frac{d}{dz}\left(K(z)\frac{dT}{dz}\right) = -A(z).$$

9. A process as in claim 6 wherein the stochastic heat conduction equation is solved using a series expansion method to obtain the closed form solution to the mean and variance in the heat flow fields, and using thermal conductivity of the subsurface layer of the earth's crust as a random parameter.

10. A process as in claim 6 wherein the expression for heat flow is obtained and the expressions for the mean and variance in heat flow derived by taking expectation and using the property of the random field.

* * * * *